US012339754B1

(12) United States Patent
Shetty et al.

(10) Patent No.: US 12,339,754 B1
(45) Date of Patent: Jun. 24, 2025

(54) SYSTEMATIC TOPOLOGY SPREAD OF PODS TO DATA PROCESSING SYSTEMS

(71) Applicant: Dell Products L.P., Round Rock, TX (US)

(72) Inventors: Sudhir Vittal Shetty, Cedar Park, TX (US); Rishi Mukherjee, Bangalore (IN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/647,289

(22) Filed: Apr. 26, 2024

(51) Int. Cl.
*G06F 11/00* (2006.01)
*G06F 11/20* (2006.01)

(52) U.S. Cl.
CPC .... *G06F 11/2041* (2013.01); *G06F 2201/805* (2013.01)

(58) Field of Classification Search
CPC .................. G06F 11/2041; G06F 2201/805
See application file for complete search history.

(56) References Cited

U.S. PATENT DOCUMENTS

| 2016/0103698 A1* | 4/2016 | Yang | G06F 11/2048 718/1 |
| 2023/0205647 A1* | 6/2023 | Sharma | G06F 11/1464 714/15 |
| 2023/0214266 A1* | 7/2023 | Deshpande | G06F 9/5072 718/104 |

* cited by examiner

*Primary Examiner* — Jason B Bryan
(74) *Attorney, Agent, or Firm* — WOMBLE BOND DICKINSON (US) LLP

(57) ABSTRACT

Methods and systems for managing operation of a deployment comprising data processing systems are disclosed. The operation of the deployment may be managed by reducing a likelihood of failure of services to a data processing system. The likelihood of the failure of the services may be reduced by assigning a pod to a data processing system based on identifying fault zones and implementing a fault zone policy. The fault zones may be identified by determining data processing systems that are managed by an infrastructure component. The fault zone policy may be implemented by limiting the assignment of the pod to any number of data processing systems within a fault zone.

20 Claims, 7 Drawing Sheets

SYSTEMATIC TOPOLOGY SPREAD OF PODS TO DATA PROCESSING SYSTEMS

FIELD

Embodiments disclosed herein relate generally to managing operation of a deployment comprising data processing systems. More particularly, embodiments disclosed herein relate to reducing a likelihood of a failure of services from failure of an infrastructure component for the data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
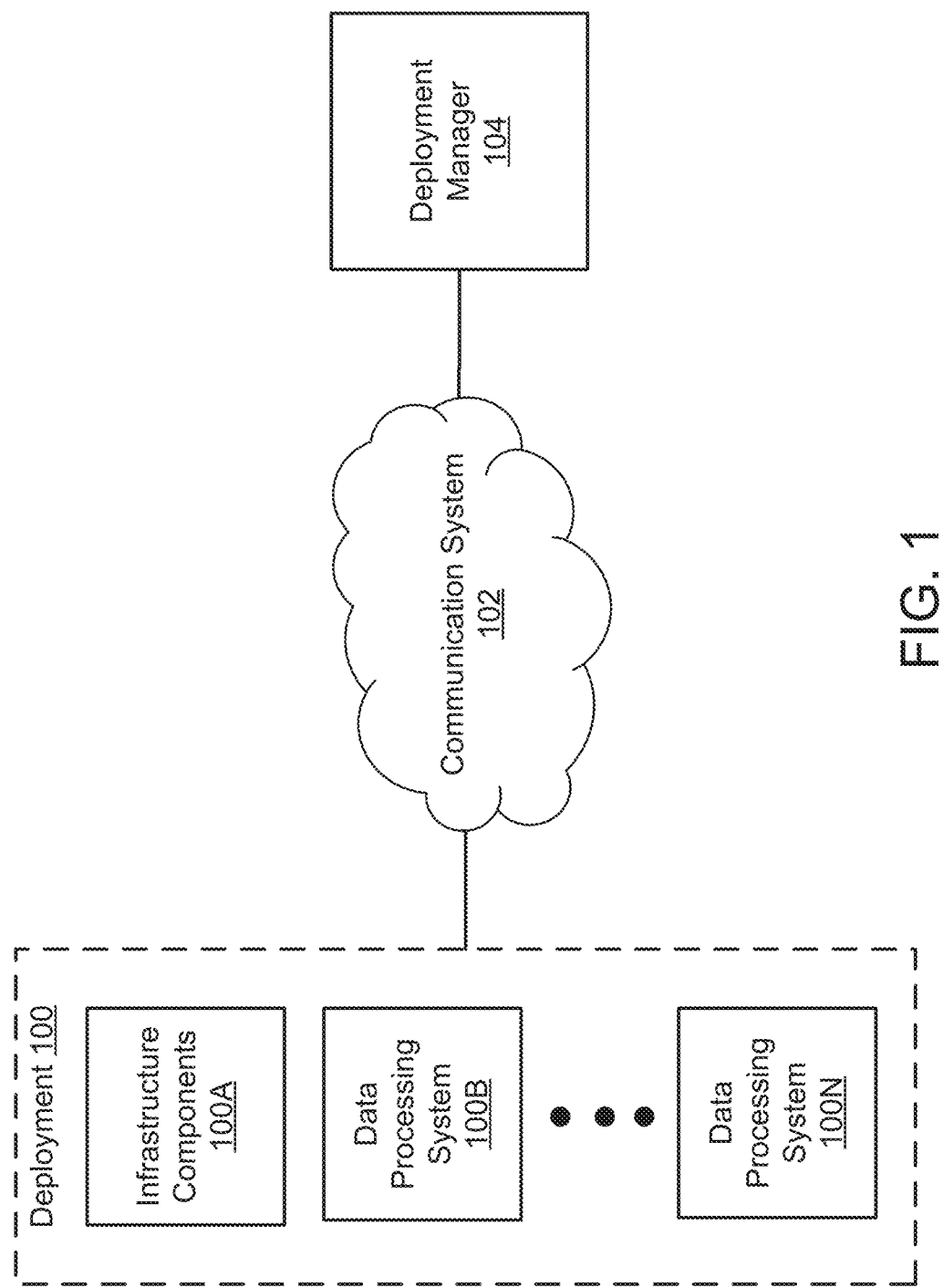
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a deployment comprising data processing systems. The operation of the deployment may be managed by reducing a likelihood of a failure of services from failure of an infrastructure component for the data processing systems. The likelihood of the loss of the services may be reduced by identifying fault zones and assigning a pod to a data processing system based on a fault zone policy.

The fault zone policy may include an infrastructure component that supports the data processing systems. An infrastructure component may include power management (e.g., from a power distribution unit (PDU), uninterruptable power supply (UPS), liquid/air cooling device, etc.) and/or network connectivity (to a local network and/or Internet). If the infrastructure component is interrupted, then the data processing systems may not receive services from the pods.

To reduce the likelihood of a failure of the services by the pod, the fault zones may be identified. The fault zones may include groupings of data processing systems impacted by the infrastructure component. In a fault zone of the fault zones, the fault zone policy may limit how many pods may be assigned to data processing systems. By limiting how many pods may be assigned to the data processing systems, the likelihood of the failure of the services by the pod may be reduced.

In an embodiment, a method for managing operation of a deployment comprising data processing systems is disclosed. The method may include (i) identifying an occurrence of an event that indicates that a new instance of a pod is to be instantiated on one of the data processing systems; (ii) based on the identifying of the occurrence of the event: (a) obtaining a fault zone policy for the new instance of the pod; (b) obtaining fault zones for the data processing systems, each of the fault zones indicating portions of the data processing systems that are members of the fault zones, and member of each of the fault zones being based on commonalities between the data processing systems that make the member of each of the fault zones subject to concurrent failure; (c) obtaining, using the fault zones and the fault zone policy, ranks for each of the data processing systems based on levels of compliance with the fault zone policy; (d) selecting, based on the ranks, one of the data processing systems; and (e) instantiating the new instance of the pod to the selected data processing system.

The occurrence of the event, based on the one of the data processing systems, may be a notification by monitoring software or an administrator requesting that the new instance of the pod be instantiated.

The pod may include of one or more container instances, a container instance of the one or more container instances comprising one or more software applications.

Each of the fault zones may include a portion of data processing systems connected to a service, where failure of the service causes the service to be unavailable to the portion of the data processing systems.

Prior to identifying the occurrence of the event, the method may include (i) mapping the data processing systems and the services received by each of the data processing systems; and (ii) identifying groupings comprising the services and the data processing systems that receive the services.

Obtaining the ranks, for each of the data processing systems, may include: (i) quantifying, based on the fault zones, a level of risk for instantiating the new instance of the pod in the respective data processing system to obtain a quantification; and (ii) ranking the data processing systems relative to one another based on the quantification.

Quantifying a level of risk may include (i) identifying a measure of compliance to the fault zone policy by the pod in the respective data processing system; and (ii) determining, based on the measure, a number of points from a point system.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, data processing systems may depend on hardware component. The hardware components may be expected to operate in a pre-defined manner.

To operate in the pre-defined manner, the hardware components may depend on infrastructure components. The infrastructure components may provide services the data processing systems. The infrastructure components may include network switches, power distribution units (PDUs), uninterruptable power supplies (UPSs), venting and air conditioning units for racks that include data processing systems, etc. Operation of the hardware components may depend on availability of services from the infrastructure components.

If the services from the infrastructure components are unavailable, then any number of the hardware components may not operate. If the hardware components cannot operate, then computer implemented services may not be provided.

In general, embodiments disclosed here relate to systems and methods for managing operation of a deployment included in data processing systems. The operation of the deployment may be managed by selectively deploying containers within a deployment.

A container may be a package that includes software and dependencies to run the software. The dependencies may include system tools, libraries, other software, etc. The container may be deployed to a data processing system and the software may be run on a container engine in the data processing system. Any number of containers may reside and be deployed in a pod.

A deployment location for the pod may be selected based on fault zones and a fault zone policy for data processing systems. The fault zones may be identified based on the infrastructure components. When an infrastructure component fails, fault zones may include any number of the data processing systems that can lose services from the pod.

In addition to the fault zones, the fault zone policy may specify how to assign a pod to a data processing system of the data processing systems. For example, the fault zone policy may limit how many pods, while assigned to data processing systems, may exist in any number of fault zones. To limit how many pods may exist in the any number of the fault zones, locations where the pods can be deployed may be ranked by a level of compliance to the fault zone policy.

By deploying the pods based on the fault zones, a likelihood of the pods being rendered inoperable may be reduced. By reducing the likelihood of the pods being rendered inoperable, the computer implemented services are more likely to be provided over time.

To provide the above noted functionality, the system may include deployment 100 and deployment manager 104. Each of these components is discussed below.

Deployment 100 may include infrastructure components 100A and any number of data processing systems 100B-100N. Infrastructure components 100A may provide various services to data processing systems 100B-100N so that the data processing systems. Infrastructure components 100A may include, for example, power management components for data processing systems 100A-100N, including uninterruptible power supplies, power distribution units, liquid/air cooling systems, etc. Infrastructure components 100A may also include network connectivity components, including network switches for data processing system 100B-100N.

Data processing systems 100A-100N may include any number of container engines to instantiate pods. The pods may host any number of software applications.

Deployment manager 104 may deploy the pods to deployment 100. To deploy the pods, deployment manager 104 may identify fault zones and a fault zone policy for the pods. Using the fault zones and the fault zone policy, deployment manager 104 may rank locations for the pods based on compliance levels to the fault zone policy. From the ranking of the locations, deployment manager 104 may deploy a pod of the pods to a location to provide services to a data processing system of the data processing system.

Figure 2A:
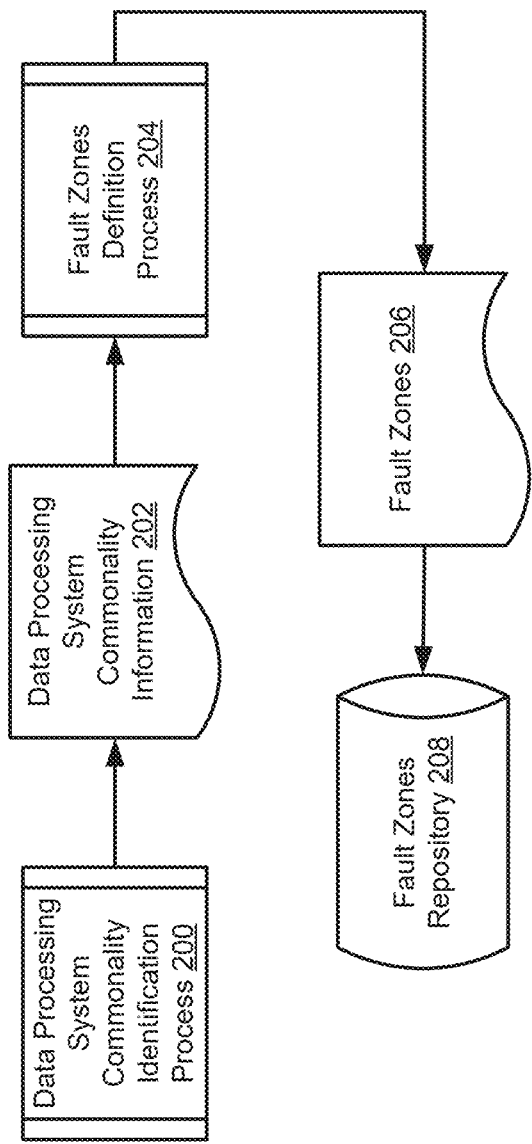
FIGS. 2A-2C show data flow diagrams illustrating operation of a system in accordance with an embodiment.
Figure 2B:
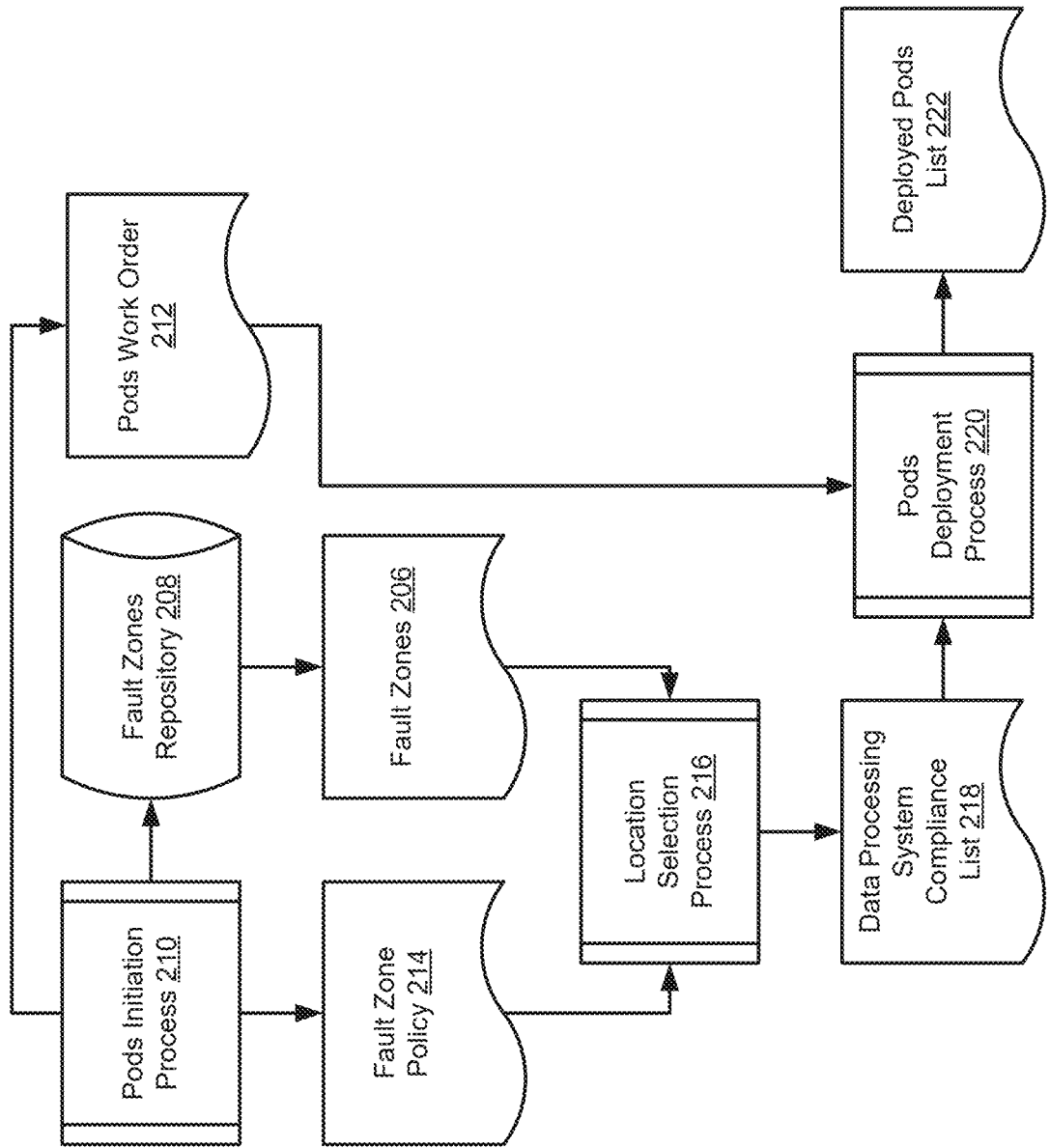
Figure 2C:
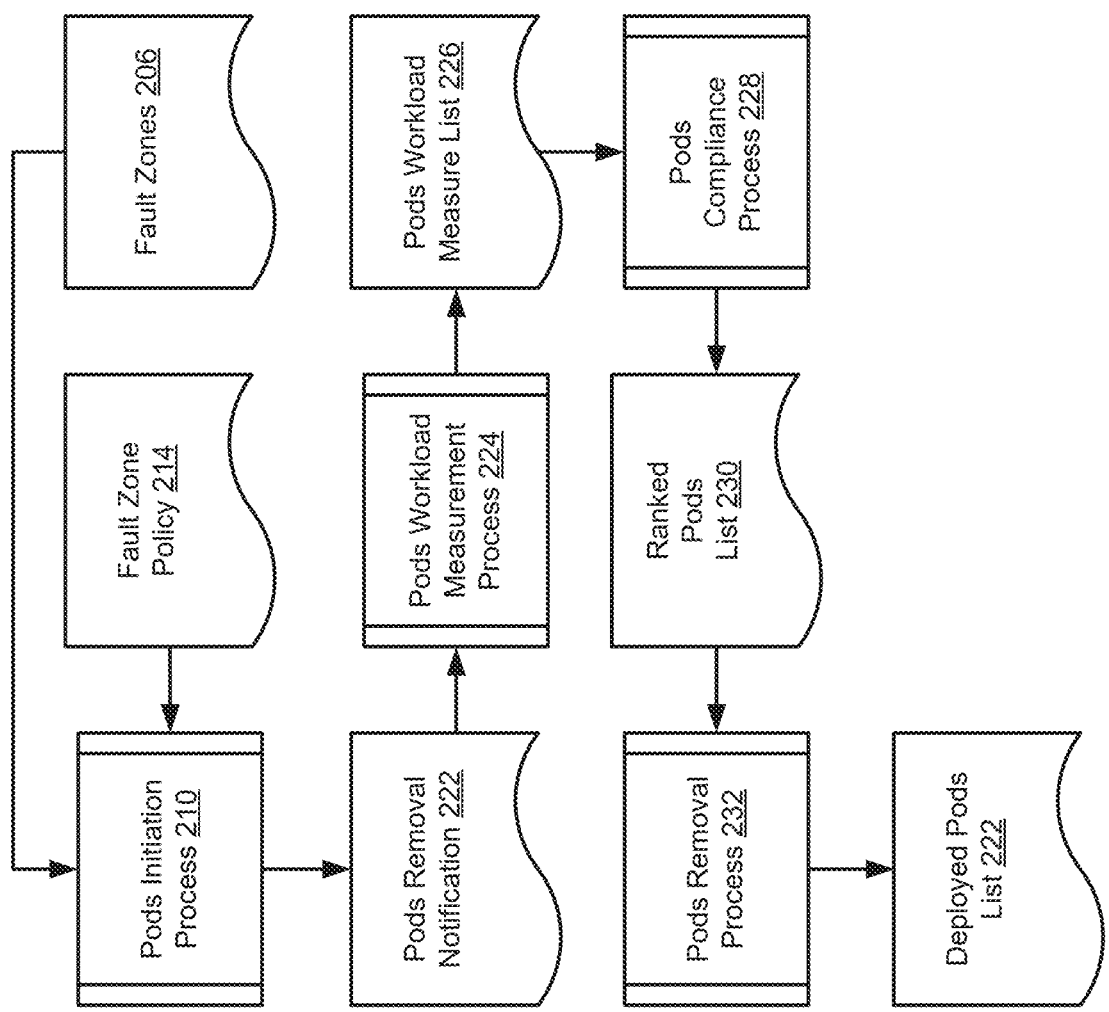
Figure 2D:
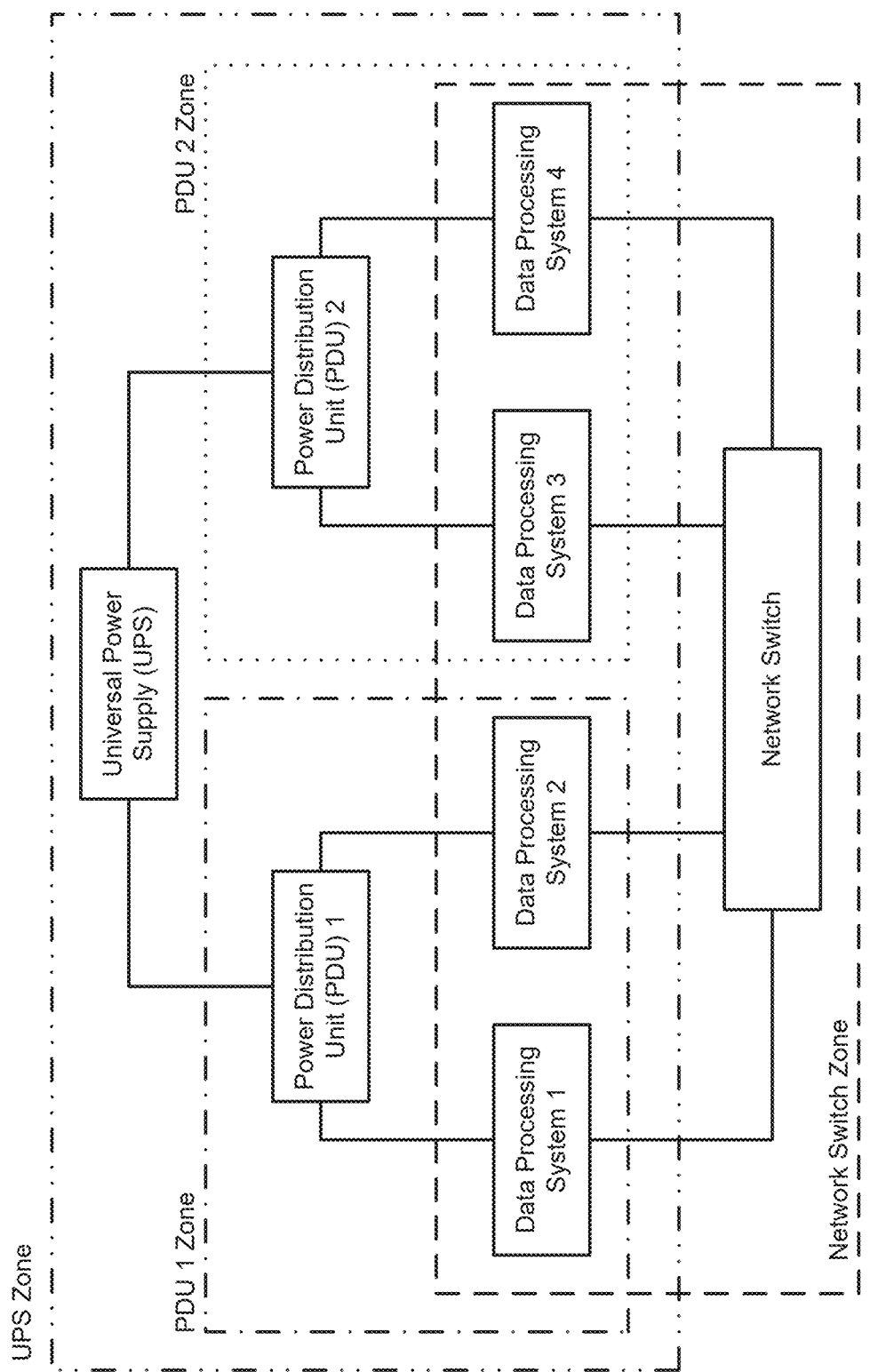
FIG. 2D shows a diagram illustrating content of a data structure in accordance with an embodiment.
Figure 3:
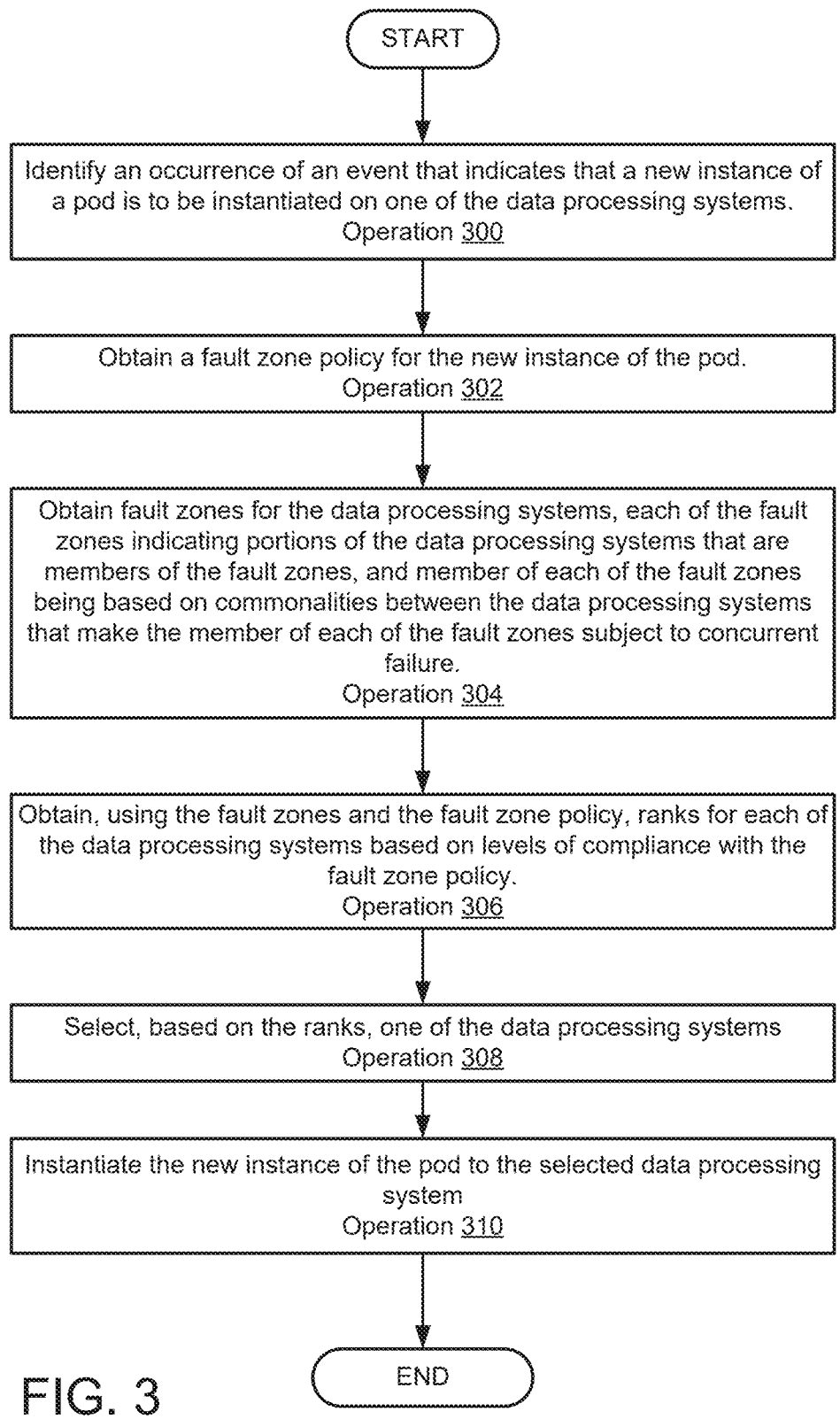
FIG. 3 shows flow a diagram illustrating a method in accordance with an embodiment.

While providing their functionality, any of deployment 100 and deployment manager 104 may perform all, or a portion, of the flows and methods shown in FIGS. 2A-3.

Any of (and/or components thereof) deployment 100 and deployment manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

To further clarify embodiments disclosed herein, data flow diagrams in accordance with an embodiment are shown in FIGS. 2A-2D. In these diagrams, flows of data and processing of data are illustrated using different sets of shapes. A first set of shapes (e.g., 202, 206, etc.) is used to represent data structures, a second set of shapes (e.g., 200, 204, etc.) is used to represent processes performed using and/or that generate data, and a third set of shapes (e.g., 208, etc.) is used to represent large scale data structures such as databases.

Turning to FIG. 2A, a first data flow diagram in accordance with an embodiment is shown. The first data flow diagram may illustrate data used in and data processing performed in identifying, labeling and/or storing a fault zone.

To generate and store the fault zone, data processing system commonality identification 200 may be performed. During data processing system commonality identification 200, services provided by infrastructure components 100A to data processing systems 100B-100N may be mapped. Deployment manager 104 may include the services by diagramming connections between each infrastructure component of infrastructure components 100A and each data processing system of data processing systems 100B-100N.

The connections may be stored in data processing system commonality information 202. Data processing system commonality information 202 may include connections between each data processing system of data processing systems 100B-100N and each infrastructure component of infrastructure components 100A. Through the connections, services may be provided by the infrastructure component and may be used by each data processing system. The connections may be used in fault zones definition process 204.

During fault zones definition process 204, fault zone 206 may be defined. Fault zone 206 may be a grouping that includes the infrastructure component and any number of data processing systems which receive services from the infrastructure component. A grouping may be generated by selecting an infrastructure component and identifying data processing systems and/or any number of infrastructure components which receive services from the infrastructure component.

When the infrastructure component fails, the services may not be received by the data processing systems. The services may fail due to power failure, hardware failure, overheating, etc. by the infrastructure component. To account for failure of the services in deployment 100, a fault zone (e.g., 206) for each infrastructure component may be defined.

Fault zone 206 may be stored in fault zones repository 208. Fault zones repository 208 may include fault zones for each infrastructure component. A fault zone of the fault zones may include groupings of data processing systems that may not receive services when the infrastructure component fails. Fault zones repository 208 may be populated with the fault zones and accessed by deployment manager 104 during identification and utilization of fault zone 206.

The identification of fault zone 206 may be performed by data processing system commonality identification 200 and fault zones definition process 204. During data processing system commonality identification 200, infrastructure components and connections between infrastructure components and data processing systems may be identified. After infrastructure components and the connections are identified, fault zone definition process 204 may be performed. During fault zone definition process 204, fault zone 206 may be defined. Fault zone definition process 204 may be performed by identifying groupings between an infrastructure component, data processing systems, and other infrastructure components. When the infrastructure component fails, services may not be received by the data processing systems and the other infrastructure components. Fault zone 206 may be stored in fault zones repository 208.

Turning to FIG. 2B, a second data flow diagram in accordance with an embodiment is shown. The second data flow diagram may illustrate data used in and data processing performed in deploying pods to data processing systems.

To deploy the pods to the data processing systems, pods initiation process 210 may be performed. During pods initiation process 210, an administrator and/or monitoring software may request that the pods be deployed to the data processing systems. The request may be made by sending a message from the administrator and/or the monitoring software to deployment manager 104. The message may be sent to initiate deployment the pods with deployment 100. The message may include pods work order 212.

Pods work order 212 may include implementation details for the pods that are used with the data processing system. The implementation details may include (i) the number of pods, (ii) the number of containers within each of the pods, and/or (iii) a list of applications hosted by the containers.

With pods work order 212, fault zones repository 208 may be queried during pods initiation process 210. During the query of fault zones repository 208, fault zones 208 may be extracted from fault zones repository 208. Fault zones 208 may include a list of fault zones for infrastructure components within deployment 100. Fault zones 208 is further described in the description of FIG. 2A.

After the extraction of fault zones 208, fault zone policy 214 may be obtained during pods initiation process 210. During pods initiation process 210, deployment manager 104 may obtain fault zone policy 214 by reading fault zone policy 214. Fault zone policy 214 may include instructions on deployment of the pods within deployment 100. The instructions may include how many pods may be deployed within a fault zone. Fault zone policy 214 may be used to select a deployment location for the pods that complies with fault zone policy 214.

Using fault zone policy 214 and fault zones 206, location selection process 216 may be performed. During location selection process 216, data processing systems may be selected for deployment of the pods. The data processing systems may be selected by ranking data processing systems for each pod of the pods. The ranking may be enumerated in data processing system compliance list 218. The ranking may be based on reducing an impact of failure by an infrastructure component. By reducing the impact of the failure by an infrastructure component, services by the pods to the data processing system may be maintained. The services by the pods may be maintained because data processing systems from data processing system compliance list 218 with the pods may be less likely to be impacted by the failure of the infrastructure component. Refer to FIG. 2D for additional information regarding the ranking of the locations for the pods.

Data processing system compliance list 218 and pods work order 212 may be ingested by pods deployment process 220. During pods deployment process 220, the pods may be deployed to deployment 100. The pods may be deployed by assigning a pod of the pods to a data processing system on data processing system compliance list 218. Based on the ranking of the pods in data processing system compliance list 218, the pod to assign may be selected. The pod may be selected by choosing the data processing system that is most compliant on data processing system compliance list 218.

After selection of the pod, the pod may be assigned to the data processing system. To assign the pod to a data processing system, pods work order 212 may be sent to an automation framework. The automation framework may create the pod. Finally, the automation framework may transmit the pod to the data processing system and instantiate the pod on the data processing system.

From pods deployment process 220, deployed pods list 222 may be obtained. Deployed pods list 220 may include a list of each pod of the pods and the data processing system to which each pod is assigned. Deployed pods list 220 may also include a list of the fault zones in which each pod may be assigned.

Thus, via the data flow illustrated in FIG. 2C, a system in accordance with an embodiment may select deployment locations for pods that are less likely to result in multiple instances of a pod that are used to provide a computer implemented service becoming inoperable at the same time. Consequently, the system may be more likely to be able to provide desired computer implemented services over time in the event of failure of various infrastructure components.

Turning to FIG. 2C, a third data flow diagram in accordance with an embodiment is shown. The third data flow diagram may illustrate data used in and data processing performed in removing deployed pods for the data processing systems.

To remove the deployed pods for the data processing systems, pods initiation process 210 may be performed. Pods initiation process 210 and ingestion of fault zones 206 and fault zone policy 214 was described in a description of FIG. 2B.

Using fault zones 206 and fault zone policy 214, pods initiation process 210 may be performed. During pods initiation process 210, pods removal notification 222 may be generated. Pods removal notification 222 may include a notice to deallocate resources from any number of pods that are listed on deployed pods list 222.

Pods removal notification 222 may be ingested by pods workload measurement process 224. During pods workload measurement process 224, operations by the pods may be checked. The operation by the pods may be checked to ensure that utilization requirements may be met. Utilization requirements may include a minimum number or read and/or write operations, a minimum queue depth, a minimum number of requests for other services, etc.

The operations of each pod of the pods by a data processing system may be listed in pods workload measure list 226. Pods workload measure list 226 may include data that clarifies whether the utilization requirements by the pods have been met.

Pods workload measure list 226 may be ingested by pods compliance process 228. During pods compliance process 228, the pods may be checked for compliance with fault zone policy 214. To check for compliance, the pods may be ranked according to a likelihood of reducing an impact of failure by an infrastructure component. By reducing the impact of the failure by an infrastructure component, services by the pods to the data processing system may be maintained. Rankings for the pods may be included in ranked pods list 230 may be ingested by pods removal process 232.

During pods removal process 232, any number of the pods included in ranked pods list 230 may be removed. Any number of the pods may be removed by selection of the pods based on ranked pods list 230 that least comply with fault zone policy 214. The pods may be removed by deallocating computing resources of the data processing system of the data processing systems from a pod of the pods.

After any number of the pods have been removed from the data processing systems, deployed pods list 222 may be updated. Deployed pods list 222 may be updated by removing pods from deployed pods list 222 that have been removed from the data processing systems.

Thus, via the data flow illustrated in FIG. 2D, a system in accordance with an embodiment may select pods for termination that are less likely to result in multiple instances of a pod that are used to provide a computer implemented service becoming inoperable at the same time. Consequently, the system may be more likely to be able to provide desired computer implemented services over time in the event of failure of various infrastructure components.

Turning to FIG. 2D, a fourth diagram in accordance with an embodiment is shown. The fourth diagram may illustrate data used in and data processing performed in assigning pods to the data processing systems in fault zones.

To assign the pods to the data processing system, any number of fault zones may be considered. The fault zones may include (i) uninterruptible power supply (UPS) zone illustrated with a dash-dot-dot boundary, (ii) power distribution unit (PDU) 1 zone illustrated with a dash-dot boundary, (iii) PDU 2 zone illustrated with a dot boundary, and (iv) network switch zone illustrated with a dash boundary. Data processing system 1-4 may be situated within any number of the boundaries.

A pod may be assigned to a data processing system based on a constraint that includes limiting the number of pods to any number of the fault zones. By limiting the pods to any number of the fault zones, an impact to services from the pods by failure of an infrastructure component may be reduced.

In a first example, assignment of a pod of the pods may be limited to PDU 1 zone and network switch zone. By limiting the assignment to PDU 1 zone and network switch zone, a pod may be assigned to data processing system 1 or data processing system 2. Further, if a pod is assigned to data processing system 1, a second pod may not be assigned to data processing system 2 because a limitation prohibits assignment of more than one pod within PDU 1 zone and network switch zone.

In a second example, assignment of a pod of the pods may be limited to PDU 2 zone and network switch zone. By limiting the assignment to PDU 2 zone and network switch zone, a pod may be assigned to data processing system 3 or data processing system 4. Further, if a pod is assigned to data processing system 3, a second pod may not be assigned to data processing system 4 because a limitation prohibits assignment of more than one pod within PDU 2 zone and network switch zone.

In either example, the limitation may limit a loss of services on the data processing systems from the pods when a loss of services from an infrastructure component, such as PDU 1, PDU 2, and/or Network Switch Zone, occurs. When the infrastructure component fails, services from the pod may not be received by the data processing systems. However, though services from the pod may not be received, an impact by the failure of the infrastructure component may be limited to services from the pod and the data processing system to which the pod is assigned.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage operation of a deployment comprising data processing systems. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing operation of a deployment comprising data processing systems in accordance with an embodiment is shown. The method may be performed, for example, by any of the components of the system of FIG. 1, and/or other components not shown therein.

At operation 300, an occurrence of an event may be identified that indicates that a new instance of a pod is to be instantiated on one of the data processing systems. The occurrence may be identified by receiving a notification from an administrator or monitoring software concerning an instantiation of the pod.

At operation 302, a fault zone policy may be obtained for the new instance of the pod. The fault zone policy may be obtained by extracting the fault zone policy from a repository of fault zone policies for the deployment.

At operation 304, fault zones may be obtained for the data processing systems, each of the fault zones indicating portions of the data processing systems that are members of the fault zones, and member of each of the fault zones being based on commonalities between the data processing systems that make the member of each of the fault zones subject to concurrent failure. The fault zones may be obtained by identifying the fault zones for the data processing systems in the deployment.

At operation 306, ranks may be obtained, using the fault zones and the fault zone policy, for each of the data processing systems based on levels of compliance with the fault zone policy. The ranks may be obtained, for each of the data processing systems by (i) quantifying, based on the fault zones, a level of risk for instantiating the new instance of the pod in the respective data processing system to obtain a quantification; and (ii) ranking the data processing systems relative to one another based on the quantification.

The level of risk may be quantified by (i) identifying a measure of compliance to the fault zone policy by the pod in the respective data processing system; and (ii) determining, based on the measure, a number of points from a point system. The measure of the compliance to the fault zone policy by the pod may be identified by determining a location of the pod relative to the pods in a fault zone. A number of points from a point system may be determined by assigning the number of points to the pod relative to the pods in the fault zone.

The data processing system relative to one another may be ranked by rank ordering, based on the number of the points, an assignment of the pod to the data processing system for each of the pods.

At operation 308, one of the data processing systems may be selected, based on the ranks. The one of the data processing system may be selected by selecting the data processing system that has the highest number of points from the rank ordering.

At operation 310, the new instance of the pod may be instantiated to the selected data processing system. The new instance of the pod may be instantiated by (i) assigning the pod to the selected data processing system and (ii) instantiating any number of container instances from the pod on the selected data processing system.

The method may end following operation 310.

Thus, via the method shown in FIG. 3, embodiments herein may likely improve a likelihood of managing a deployment comprising data processing systems that provide computer implemented services. By improving the likelihood of managing a deployment comprising data processing systems that provide computer implemented services, the data processing systems may be more likely to provide desirable computer implemented services by, for example, selectively assigning pods to data processing systems, reducing a likelihood of a loss of services from the pods on a data processing system, etc.

Figure 4:
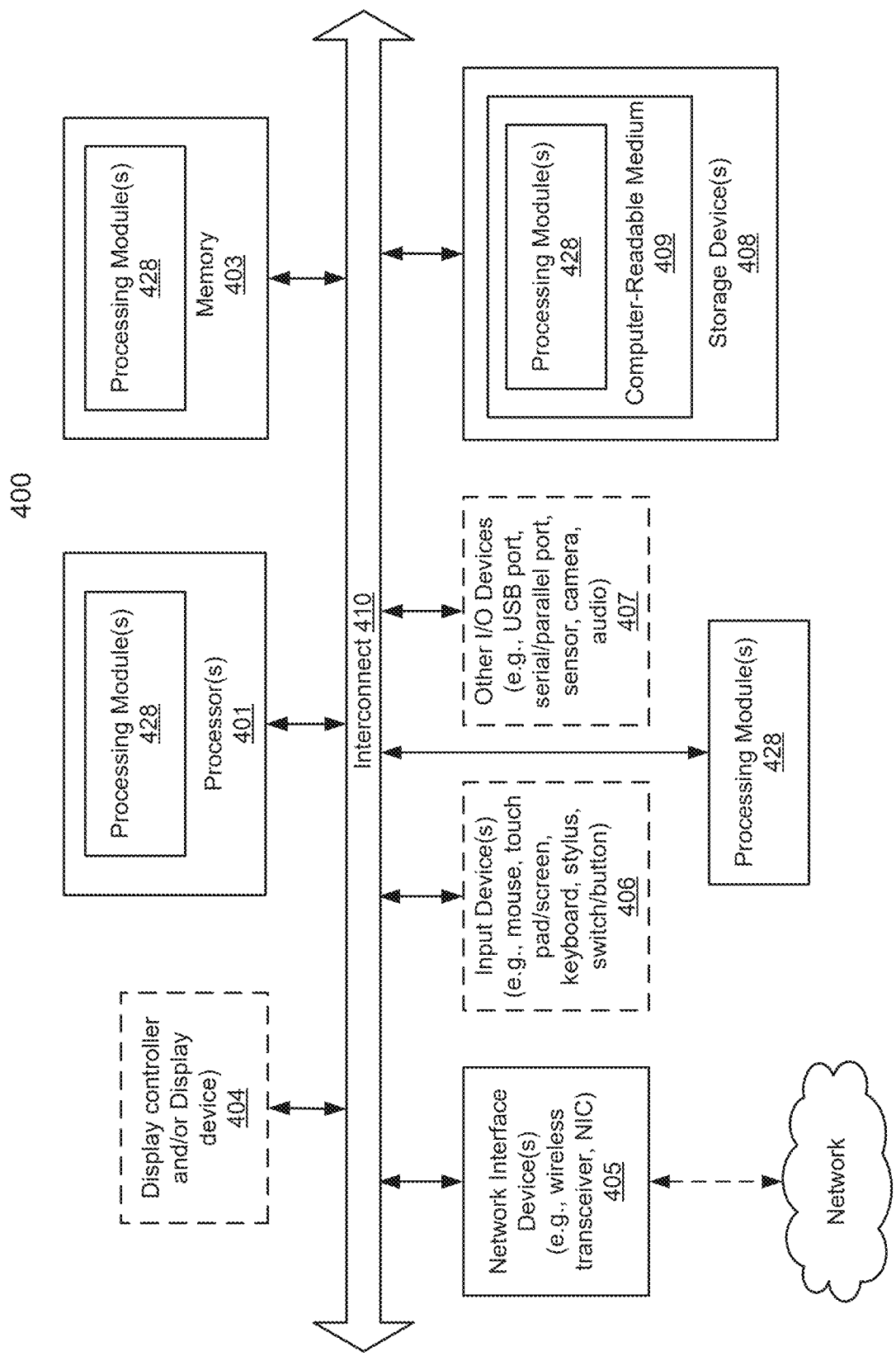
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a deployment comprising data processing systems, the method comprising:
   identifying an occurrence of an event that indicates that a new instance of a pod is to be instantiated on one of the data processing systems;
   based on the identifying of the occurrence of the event:
      obtaining a fault zone policy for the new instance of the pod;
      obtaining fault zones for the data processing systems, each of the fault zones indicating portions of the data processing systems that are members of the fault zones, and membership of a given fault zone of the fault zones being based on commonalities between member data processing systems of the given fault zone that subject the member data processing systems to concurrent failure;
      obtaining, using the fault zones and the fault zone policy, ranks for each of the data processing systems based on levels of compliance with the fault zone policy;
      selecting, based on the ranks, one of the data processing systems; and
      instantiating the new instance of the pod to the selected data processing system.

2. The method of claim 1, wherein the occurrence of the event, based on the one of the data processing systems, is a notification by monitoring software or an administrator requesting that the new instance of the pod be instantiated.

3. The method of claim 1, wherein the new instance of the pod comprises of one or more container instances, a container instance of the one or more container instances comprising one or more software applications.

4. The method of claim 1, wherein each of the fault zones comprises a portion of data processing systems connected to a service, where failure of the service causes the service to be unavailable to the portion of the data processing systems.

5. The method of claim 4, wherein the fault zone policy restricts assignment of the new instance of the pod to the data processing systems based on locations for the new instance of the pod and the fault zones.

6. The method of claim 1, further comprising:
   prior to identifying the occurrence of the event:
      mapping the data processing systems and services received by each of the data processing systems; and identifying groupings comprising the services and the data processing systems that receive the services.

7. The method of claim 1, wherein obtaining the ranks comprises:
for each of the data processing systems:
quantifying, based on the fault zones, a level of risk for instantiating the new instance of the pod in the respective data processing system to obtain a quantification; and
ranking the data processing systems relative to one another based on the quantification.

8. The method of claim 7, wherein quantifying a level of risk comprises:
identifying a measure of compliance to the fault zone policy by the new instance of the pod in the respective data processing system; and
determining, based on the measure, a number of points from a point system.

9. A non-transitory machine-readable medium having instructions stored therein, which when executed by a processor, cause the processor to perform operations for managing operation of a deployment comprising data processing systems, the operation comprising:
identifying an occurrence of an event that indicates that a new instance of a pod is to be instantiated on one of the data processing systems;
based on the identifying of the occurrence of the event:
obtaining a fault zone policy for the new instance of the pod;
obtaining fault zones for the data processing systems, each of the fault zones indicating portions of the data processing systems that are members of the fault zones, and membership of a given fault zone of the fault zones being based on commonalities between member data processing systems of the given fault zone that subject the member data processing systems to concurrent failure;
obtaining, using the fault zones and the fault zone policy, ranks for each of the data processing systems based on levels of compliance with the fault zone policy;
selecting, based on the ranks, one of the data processing systems; and
instantiating the new instance of the pod to the selected data processing system.

10. The non-transitory machine-readable medium of claim 9, wherein the occurrence of the event, based on the one of the data processing systems, is a notification by monitoring software or an administrator requesting that the new instance of the pod be instantiated.

11. The non-transitory machine-readable medium of claim 9, wherein the new instance of the pod comprises of one or more container instances, a container instance of the one or more container instances comprising one or more software applications.

12. The non-transitory machine-readable medium of claim 9, wherein each of the fault zones comprises a portion of data processing systems connected to a service, where failure of the service causes the service to be unavailable to the portion of the data processing systems.

13. The non-transitory machine-readable medium of claim 12, wherein the fault zone policy restricts assignment of the new instance of the pod to the data processing systems based on locations for the new instance of the pod and the fault zones.

14. The non-transitory machine-readable medium of claim 9, wherein the operations further comprise:
prior to identifying the occurrence of the event:
mapping the data processing systems and services received by each of the data processing systems; and
identifying groupings comprising the services and the data processing systems that receive the services.

15. A system, comprising:
a processor; and
a memory coupled to the processor to store instructions, which when executed by the processor, cause the processor to perform operations managing operation of a deployment comprising data processing systems, the operations comprising:
identifying an occurrence of an event that indicates that a new instance of a pod is to be instantiated on one of the data processing systems;
based on the identifying of the occurrence of the event:
obtaining a fault zone policy for the new instance of the pod;
obtaining fault zones for the data processing systems, each of the fault zones indicating portions of the data processing systems that are members of the fault zones, and membership of a given fault zone of the fault zones being based on commonalities between member data processing systems of the given fault zone that subject the member data processing systems to concurrent failure;
obtaining, using the fault zones and the fault zone policy, ranks for each of the data processing systems based on levels of compliance with the fault zone policy;
selecting, based on the ranks, one of the data processing systems; and
instantiating the new instance of the pod to the selected data processing system.

16. The system of claim 15, wherein the occurrence of the event, based on the one of the data processing systems, is a notification by monitoring software or an administrator requesting that the new instance of the pod be instantiated.

17. The system of claim 15, wherein the new instance of the pod comprises of one or more container instances, a container instance of the one or more container instances comprising one or more software applications.

18. The system of claim 15, wherein each of the fault zones comprises a portion of data processing systems connected to a service, where failure of the service causes the service to be unavailable to the portion of the data processing systems.

19. The system of claim 18, wherein the fault zone policy restricts assignment of the new instance of the pod to the data processing systems based on locations for the new instance of the pod and the fault zones.

20. The system of claim 15, wherein the operations further comprise:
prior to identifying the occurrence of the event:
mapping the data processing systems and services received by each of the data processing systems; and
identifying groupings comprising the services and the data processing systems that receive the services.

* * * * *